(12) United States Patent
Amadie et al.

(10) Patent No.: US 11,729,086 B2
(45) Date of Patent: *Aug. 15, 2023

(54) METHODS AND SYSTEMS FOR INTERNET SPEED TESTING

(71) Applicant: Comcast Cable Communications, LLC, Philadelphia, PA (US)

(72) Inventors: Imad Amadie, Mount Laurel, NJ (US); Karthik Sundaram, Princeton, NJ (US); Peifong Ren, Princeton, NJ (US); John Raezer, Bryn Mawr, PA (US); Brandon Groff, West Chester, PA (US); Eric Bertrand, Montreal (CA)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/220,607

(22) Filed: Apr. 1, 2021

(65) Prior Publication Data
US 2022/0060403 A1 Feb. 24, 2022

Related U.S. Application Data

(63) Continuation of application No. 16/116,698, filed on Aug. 29, 2018, now Pat. No. 10,999,181.

(51) Int. Cl.
H04L 12/66 (2006.01)
H04L 12/26 (2006.01)
H04W 24/02 (2009.01)
H04W 24/08 (2009.01)
G06F 11/34 (2006.01)
H04L 43/50 (2022.01)
H04L 43/0888 (2022.01)

(52) U.S. Cl.
CPC ......... *H04L 43/50* (2013.01); *G06F 11/3409* (2013.01); *H04L 12/66* (2013.01); *H04L 43/0888* (2013.01); *H04W 24/02* (2013.01); *H04W 24/08* (2013.01); *G06F 2201/875* (2013.01)

(58) Field of Classification Search
CPC ..... H04L 43/50; H04L 12/66; H04L 43/0888; H04W 24/02; H04W 24/08; G06F 11/3409; G06F 2201/875
USPC ........................................................ 370/252
See application file for complete search history.

(56) References Cited

U.S. PATENT DOCUMENTS

| | | | |
|---|---|---|---|
| 6,625,648 B1 | 9/2003 | Schwaller et al. | |
| 7,424,526 B1 | 9/2008 | Hansen et al. | |
| 8,713,160 B1 | 4/2014 | Ou et al. | |
| 9,331,925 B2 | 5/2016 | Patel et al. | |
| 10,164,850 B2 * | 12/2018 | Tapia | H04L 41/5087 |
| 2015/0358225 A1 | 12/2015 | Zawari | |
| 2018/0152369 A1 | 5/2018 | McCallen et al. | |

(Continued)

*Primary Examiner* — Gbemileke J Onamuti
(74) *Attorney, Agent, or Firm* — Ballard Spahr LLP

(57) ABSTRACT

Described herein are methods and systems for network performance testing. A computing device may receive a network performance request. The computing device may perform a network performance test, and determine comparable devices of one or more devices associated with the network performance request. The computing device may determine a network performance parameter for the comparable devices, and determine that one or more devices associated with the network performance request are impacting the network performance test.

20 Claims, 6 Drawing Sheets

(56) References Cited

U.S. PATENT DOCUMENTS

2019/0246298 A1 8/2019 Roman et al.
2019/0297517 A1 9/2019 Hyun et al.

* cited by examiner

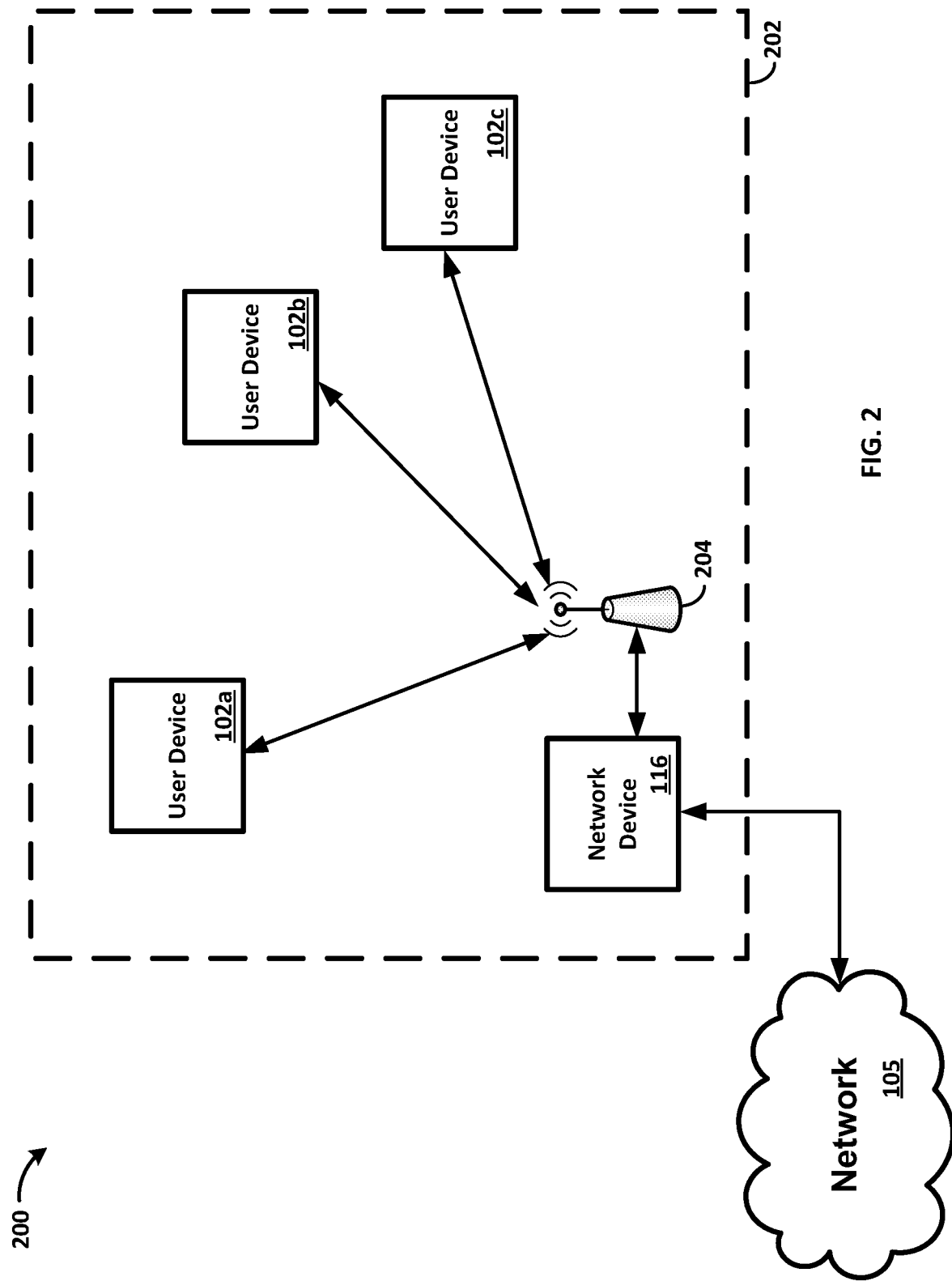

310 — RECEIVE NETWORK PERFORMANCE DATA

320 — RECEIVE A NETWORK PERFORMANCE REQUEST FROM A USER DEVICE THAT HAS AN IDENTIFIER OF THE USER DEVICE AND AN IDENTIFIER OF A NETWORK DEVICE

330 — PERFORM A NETWORK PERFORMANCE TEST

340 — DETERMINE ONE OR MORE COMPARABLE USER DEVICES

350 — DETERMINE ONE OR MORE COMPARABLE NETWORK DEVICES

360 — DETERMINE A NETWORK PERFORMANCE PARAMETER OF THE ONE OR MORE COMPARABLE USER DEVICES AND NETWORK DEVICES

370 — DETERMINE WHETHER THE USER DEVICE OR THE NETWORK DEVICE IS NEGATIVELY IMPACTING THE NETWORK PERFORMANCE TEST

410 — RECEIVE NETWORK PERFORMANCE DATA

420 — RECEIVE A NETWORK PERFORMANCE REQUEST FROM A USER DEVICE THAT HAS AN IDENTIFIER OF THE USER DEVICE AND AN IDENTIFIER OF A NETWORK DEVICE

430 — PERFORM A NETWORK PERFORMANCE TEST

440 — DETERMINE ONE OR MORE COMPARABLE USER DEVICES

450 — DETERMINE ONE OR MORE COMPARABLE NETWORK DEVICES

460 — DETERMINE AN EXPECTED PERFORMANCE PARAMETER FOR THE USER DEVICE

470 — DETERMINE WHETHER THE USER DEVICE OR THE NETWORK DEVICE IS NEGATIVELY IMPACTING THE NETWORK PERFORMANCE TEST BASED ON A COMPARISON OF THE EXPECTED PERFORMANCE PARAMETER AND THE RESULT OF THE NETWORK PERFORMANCE TEST

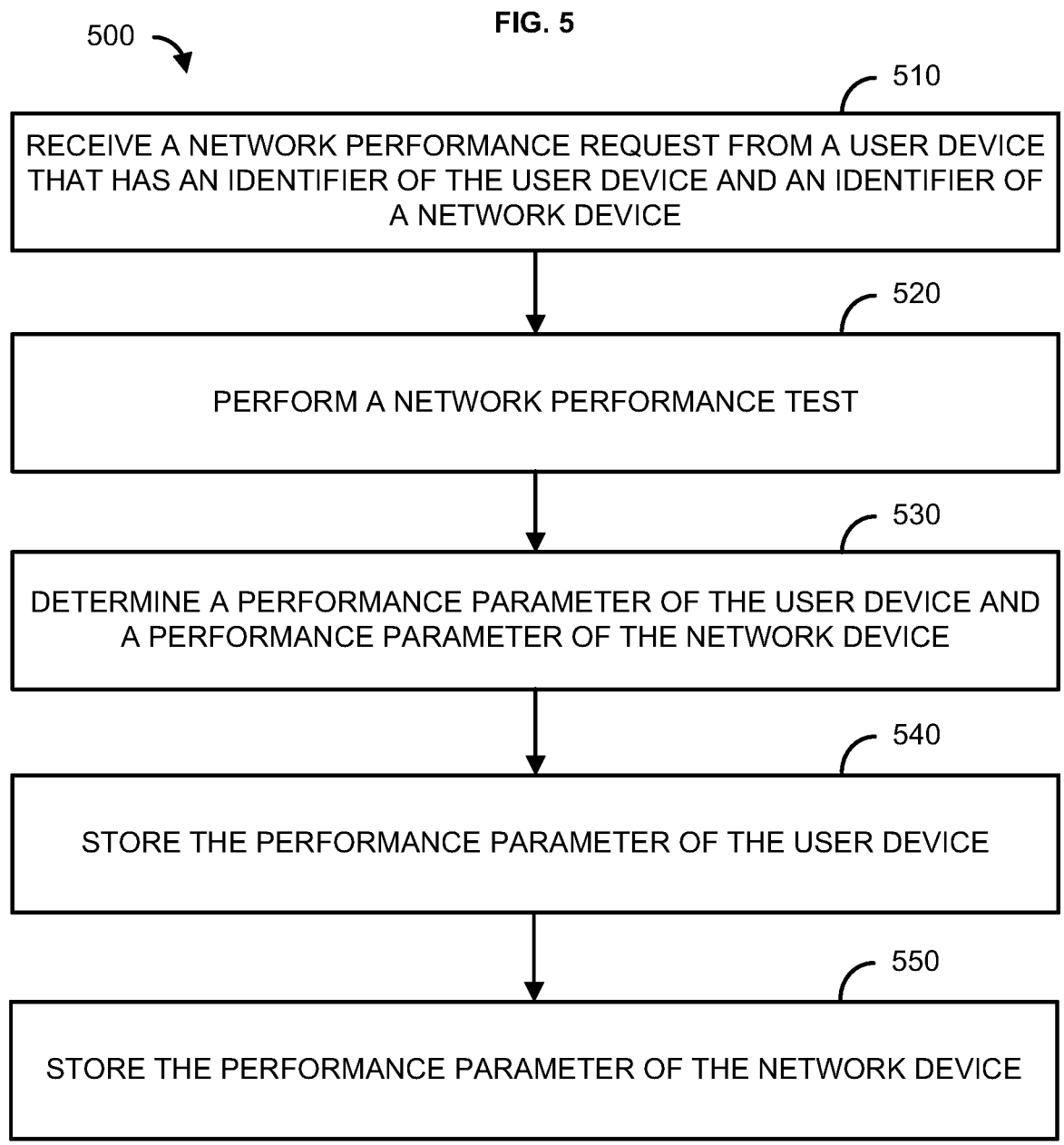

METHODS AND SYSTEMS FOR INTERNET SPEED TESTING

CROSS REFERENCE TO RELATED APPLICATION

This application is a continuation of U.S. patent application Ser. No. 16/116,698, filed Aug. 29, 2018, the entire content of which is herein incorporated by reference in its entirety.

BACKGROUND

A network performance test determines the speed (e.g., upload speed and/or download speed) and/or latency of a network based on how quickly data can be transferred between a user device and a computing device (e.g., via the Internet). As an example, when a user requests the network performance test, the download speed is the speed, in bits per second, that data can be downloaded to the user device from the computing device. Similarly, the upload speeds is the speed, in bits per second, that data can be uploaded to the computing device from the user device. For example, a user may navigate to a website to request a network performance test that determines the speed of the connection between the user's device and a computing device associated with the website. After the performance test is completed, the user is presented with the download speed, upload speed and/or latency that the user device was able to achieve. However, if the download speed, the upload speed, and/or the latency is below expected values (e.g., below the speeds the user pays for from an Internet Service Provider), the user is not provided information related to why the internet connection (e.g., the download speed, the upload speed, and/or the latency) is below the expected values. These and other shortcomings are addressed by the methods and systems described herein.

SUMMARY

It is to be understood that both the following general description and the following detailed description are exemplary and explanatory only and are not restrictive. Provided are methods and systems for performing a network performance test. A user device may request a network performance test be performed. For example, the user device may transfer data with a computing device to determine results of the network performance test. The network performance test may provide the actual results of the network performance test, as well as expected results of the network performance test. The network performance test may further indicate that the network performance is negatively impacted by a specific device(s) associated with the network performance test (e.g., the user device, a network device, a network connection, the computing device, etc.). A recommendation to improve the network performance may be provided to the user device (e.g., based on the difference between the expected result and the actual result). The recommendation may include one or more recommended changes to one or more settings of the specific device(s). The one or more recommended changes may also be applied automatically to improve network performance.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, show examples and together with the description, serve to explain the principles of the methods and systems:

FIG. 2 is an example of a system;
FIG. 3 is a flowchart of an example method;
FIG. 4 is a flowchart of an example method;
FIG. 5 is a flowchart of an example method.

DETAILED DESCRIPTION

Figure 1:
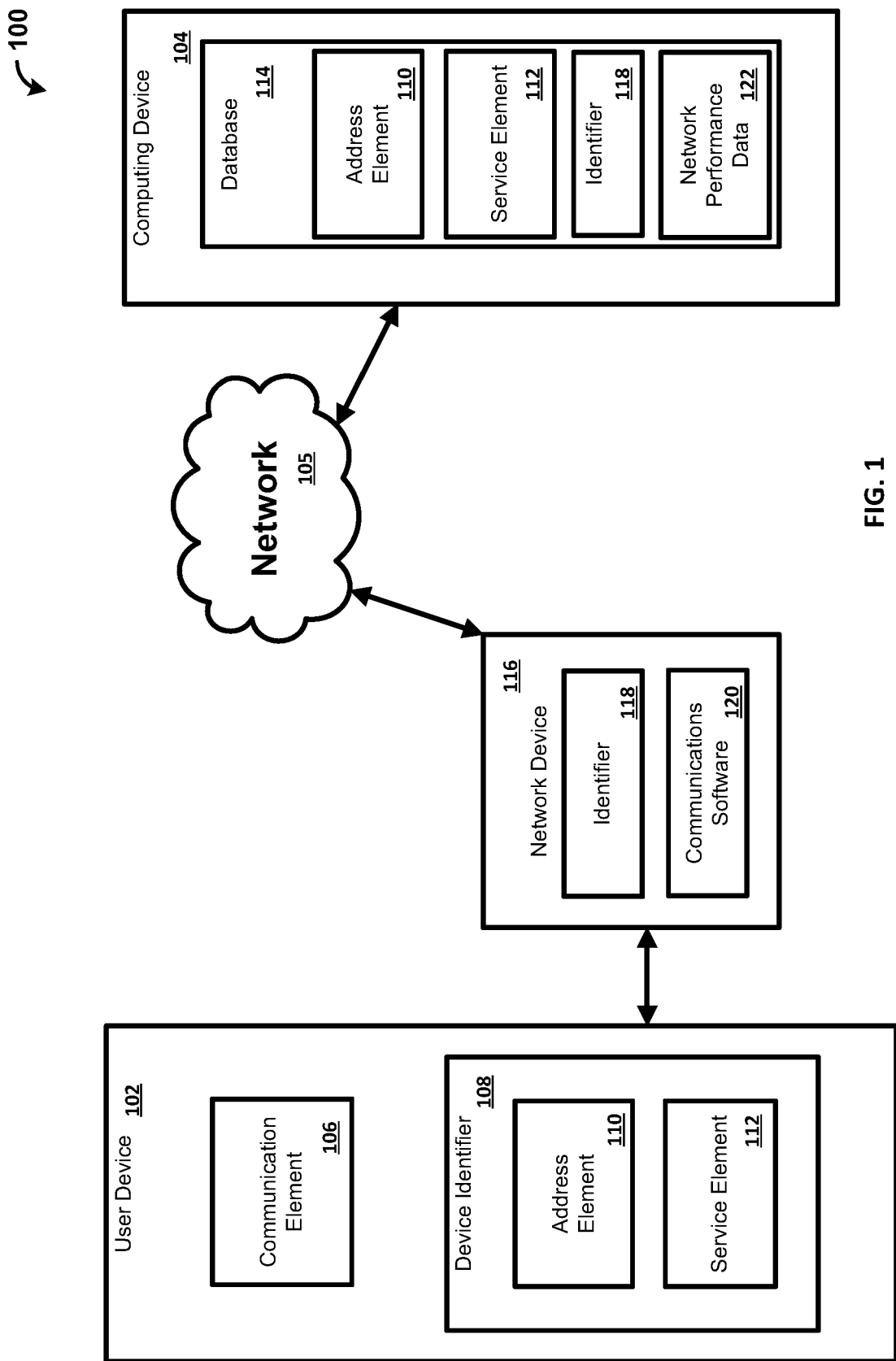
FIG. 1 is an example of a system.

Before the present methods and systems are disclosed and described, it is to be understood that the methods and systems are not limited to specific methods, specific components, or to particular implementations. It is also to be understood that the terminology used herein is for the purpose of describing particular examples only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another example includes from the one particular value and/or to the other particular value. Similarly, when values are expressed as approximations, by use of the antecedent "about," it will be understood that the particular value forms another example. It will be further understood that the endpoints of each of the ranges are significant both in relation to the other endpoint, and independently of the other endpoint.

"Optional" or "optionally" means that the subsequently described event or circumstance may or may not occur, and that the description includes examples where said event or circumstance occurs and examples where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal example. "Such as" is not used in a restrictive sense, but for explanatory purposes.

Described are components that may be used to perform the described methods and systems. These and other components are described herein, and it is understood that when combinations, subsets, interactions, groups, etc. of these components are described that while specific reference of each various individual and collective combinations and permutation of these may not be explicitly described, each is specifically contemplated and described herein, for all methods and systems. This applies to all examples of this application including, but not limited to, steps in described methods. Thus, if there are a variety of additional steps that may be performed it is understood that each of these additional steps may be performed with any specific example or combination of examples of the described methods.

The present methods and systems may be understood more readily by reference to the following detailed description of examples and the examples included therein and to the Figures and their previous and following description.

As will be appreciated by one skilled in the art, the methods and systems may take the form of an entirely hardware example, an entirely software example, or an example combining software and hardware example. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Examples of the methods and systems are described below with reference to block diagrams and flowcharts of methods, systems, apparatuses and computer program products. It will be understood that each block of the block diagrams and flowcharts, and combinations of blocks in the block diagrams and flowcharts, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowcharts support combinations of means for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

In various examples, this detailed disclosure may refer to consuming content or to the consumption of content, which may also be referred to as "accessing" content, "providing" content, "viewing" content, "listening" to content, "rendering" content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Note that in various examples this detailed disclosure may refer to a given entity performing some action. It should be understood that this language may in some cases mean that a system (e.g., a computer) owned and/or controlled by the given entity is actually performing the action.

Methods and systems are described for performing a network performance test. For example, a user device may request that the network performance test be performed to determine characteristics of the user device's network connection (e.g., internet connection). The request may identify the user device and at least one network device associated with the user device. As an example, the network performance test may be an internet speed test that determines the download speed, the upload speed, and/or the latency of the user device and a network device. The network performance test may be accessed via a web-based tool and/or a software client on a gateway device. The results of the network performance test may be analyzed based on comparable user devices and comparable network devices that have similar capabilities to the user device and the network device to determine whether the user device and/or the network device are impacting the network performance test. Further, the capabilities of the user device being tested and the network device (e.g., a local gateway) can be learned and transmitted to the computing device for analysis. Additionally, the network speed test can take into account Wi-Fi environment data. Wi-Fi environment data can include, for example, how many other Access Points (e.g., neighbors' access points) the gateway can detect, how many devices are connected to the gateway, the wireless protocol of the gateway, the number of wireless antennas of the gateway, and interference detected by the gateway. The Wi-Fi environment data can be maintained and assessed to determine the load on the wireless network.

Crowd sourced data related to one or more other speed tests may be gathered, maintained, and accessed to determine which of the crowd sourced data may be relevant to the particular test. For example, a database may contain crowd sourced data related to a plurality of user devices and a plurality of network devices. The crowd sourced data may include the hardware characteristics of the devices (e.g., processor, network interface, memory, etc.) and software characteristics of the device (e.g., operating system, firmware, etc.). The crowd sourced data may be collected and stored after the plurality of user devices request respective network performance tests. The results of the network performance test requested by the user device may be analyzed based on the crowd sourced data in the database to determine if the network performance is impacted by the user device and/or the network device. For example, the crowd sourced data may be used to determine an expected result of the network performance test. The expected result of the network performance test may be compared to the actual results of the network performance test to determine whether a device is negatively impacting the network connection of the user device. As an example, the user device and/or the network device may negatively impact the performance test, which indicates that the user device is unable to fully utilize the network connection. A recommendation may be provided to the user device to facilitate improving the network connection for the user device.

FIG. 1 shows an example system 100 in which the present methods and systems may operate. In an example, one or more network devices may be configured to provide various services to one or more devices, such as devices located at or near a premises. In another example, the network devices may be configured to provide internet service for the premises and/or a particular service or services available at the premises. Those skilled in the art will appreciate that present methods may be implemented in various types of networks and systems that employ both digital and analog equipment. One skilled in the art will appreciate that provided herein is a functional description and that the respective functions may be performed by software, hardware, or a combination of software and hardware.

The system 100 may comprise a user device 102 in communication with a computing device 104 such as a server, for example. The computing device 104 may be disposed locally or remotely relative to the user device 102. As an example, the user device 102 and the computing device 104 may be in communication via a private and/or public network 105 such as the Internet or a local area network. Other forms of communications may be used such as wired and wireless telecommunication channels, for example.

In an example, the user device 102 may be an electronic device such as a computer, a smartphone, a laptop, a tablet, a set top box, a display device, or other device capable of communicating with the computing device 104. As an example, the user device 102 may comprise a communication element 106 for providing an interface to a user to interact with the user device 102 and/or the computing device 104. The communication element 106 may be any interface for presenting and/or receiving information to/from the user, such as user feedback. An example interface may be a communication interface such as a web browser (e.g., Internet Explorer, Mozilla Firefox, Google Chrome, Safari, or the like). Other software, hardware, and/or interfaces may be used to provide communication between the user and one or more of the user device 102 and the computing device 104. As an example, the communication element 106 may request a network performance test. As another example, the communication element 106 may transmit data to the computing device 104 to facilitate the network performance test.

In an example, the user device 102 may be associated with a user identifier or device identifier 108. As an example, the device identifier 108 may be any identifier, token, character, string, or the like, for differentiating one user or user device (e.g., user device 102) from another user or user device. In a further example, the device identifier 108 may identify a user or user device as belonging to a particular class of users or user devices. As another example, the device identifier 108 may comprise information relating to the user device such as a manufacturer, a model or type of device, a service provider associated with the user device 102, a state of the user device 102, a locator, and/or a label or classifier. Other information may be represented by the device identifier 108.

In an example, the device identifier 108 may comprise an address element 110 and a service element 112. In an example, the address element 110 may comprise or provide an internet protocol address, a network address, a media access control (MAC) address, an Internet address, or the like. As an example, the address element 110 may be relied upon to establish a communication session between the user device 102 and the computing device 104 or other devices and/or networks. For example, the address element 100 may be used to perform a network performance test between the user device 102 and the computing device 104. As a further example, the address element 110 may be used as an identifier or locator of the user device 102. In an example, the address element 110 may be persistent for a particular network.

In an example, the service element 112 may comprise an identification provided by a service provider associated with the user device 102 and/or with the class of user device 102. The class of the user device 102 may be related to a type of device, capability of device, type of service being provided, and/or a level of service (e.g., business class, service tier, service package, etc.). As an example, the service element 112 may comprise information relating to or provided by a communication service provider (e.g., Internet Service Provider) that is providing or enabling data flow such as communication services (e.g., an Internet connect) to the user device 102. As a further example, the service element 112 may comprise information relating to a service provider for one or more particular services relating to the user device 102. In an example, the address element 110 may be used to identify or retrieve data from the service element 112, or vice versa. As a further example, one or more of the address element 110 and the service element 112 may be stored remotely from the user device 102 and retrieved by one or more devices such as the user device 102 and the computing device 104. Other information may be represented by the service element 112.

In an example, the computing device 104 may be a server for communicating with the user device 102. As an example, the computing device 104 may communicate with the user device 102 for providing data and/or services. As an example, the computing device 104 may provide services such as network (e.g., Internet) connectivity, network printing, media management (e.g., media server), content services, streaming services, broadband services, or other network-related services. In an example, the computing device 104 may allow the user device 102 to interact with remote resources such as data, devices, and files. As an example, the computing device may be configured as (or disposed at) a central location (e.g., a headend, or processing facility), which may receive content (e.g., data, input programming) from multiple sources. The computing device 104 may combine the content from the multiple sources and may distribute the content to user (e.g., subscriber) locations via a distribution system. As a further example, the computing device 104 may provide a network performance test to the user device 102 to determine the performance of the network between the user device 102 and the computing device 104.

In an example, one or more network devices 116 may be in communication with a network such as network 105. As an example, the network device 116 may facilitate the connection of a device, such as user device 102, to the network 105. As a further example, the network device 116 may be configured as a wireless access point (WAP). In an example, the network device 116 may be configured to allow one or more wireless devices to connect to a wired and/or wireless network using Wi-Fi, Bluetooth or any desired method or standard.

In an example, the network device 116 may be configured as a local area network (LAN). As an example, the network device 116 may comprise a dual band wireless access point. As an example, the network device 116 may be configured with a first service set identifier (SSID) (e.g., associated with a user network or private network) to function as a local network for a particular user or users. As a further example, the network device 116 may be configured with a second service set identifier (SSID) (e.g., associated with a public/community network or a hidden network) to function as a secondary network or redundant network for connected communication devices.

In an example, the network device 116 may comprise an identifier 118. As an example, one or more identifiers may be or relate to an Internet Protocol (IP) Address IPV4/IPV6 or a media access control address (MAC address) or the like. As a further example, one or more identifiers 118 may be a unique identifier for facilitating communications on the physical network segment. As an example, the identifier 118 may be associated with a physical location of the network device 116. In an example, a plurality of the network devices 116 may each comprise a distinct identifier 118.

In an example, the network device 116 may comprise communications software 120 that controls operation of the network device 116, as well as communicating with other devices (e.g., the user device 102, the computing device 104). The communications software 120 may include settings of the network device 116. For example, the communications software 120 may include an operating system that controls the network device 116. For example, the network device 116 may be a wireless access point and the communications software 120 comprises the information related to operating the wireless network provided by the network device 116. As will be appreciated by one skilled in the art, the communications software 120 may be any combination of firmware and/or software for controlling operation of the network device 116, as well as communicating with other devices (e.g., the user device 102, the computing device 104).

In an example, the communications software 120 may allow the network device 116 to communicate settings and/or operating characteristics of the network device 116 to the user device 102 and/or computing device 104. As an example, the computing device 104 may request information about the communications software 120. For example, the computing device 104 may request the current operating system for the network device 116 to ensure that the communications software 120 is up to date. As another example, the computing device 104 may request the current operating settings of the network device 116 to ensure the network device 116 is operating with the optimal settings.

In an example, the communications software 120 may be updated. For example, the user device 102 and/or the computing device 104 may transmit updated communications software 120 to the network device 116. After receiving the updated communications software 120, the network device 116 updates the communications software 120. The updated communications software 120 may comprise new settings, new software, and so forth. As an example, the computing device 104 may transmit new settings to the network device 116 after determining the network device 116 is not operating under the optimal settings. As another example, the network device 116 may automatically update the communications software 120. For example, the network device 116 may request updated settings and/or software from another device (e.g., the user device 102, the computing device 104). The network device 116 may automatically update the communications software 120 after receiving the updated settings and/or software.

The computing device 104 may manage the communication between the user device 102 and a database 114 for sending and receiving data therebetween. The database 114 may store a plurality of files (e.g., web pages), user identifiers or records, or other information. The user device 102 may request and/or retrieve a file from the database 114. The database 114 may store information relating to the user device 102 such as the address element 110 and/or the service element 112. The computing device 104 may obtain the device identifier 108 from the user device 102 and retrieve information from the database 114 such as the address element 110 and/or the service elements 112. The computing device 104 may obtain the address element 110 from the user device 102 and may retrieve the service element 112 from the database 114, or vice versa. Any information may be stored in and retrieved from the database 114. The database 114 may be disposed remotely from the computing device 104 and accessed via direct or indirect connection. The database 114 may be integrated with the computing device 104 or some other device or system.

The computing device 104 may provide network testing services to the user device 102. The user device 102 may request a network performance test (e.g., an Internet Speed Test) that determines the communications capability of the network (e.g., the speed of the connection) between the computing device 104 and the user device 102. The network performance test may be accessed via a web-based tool and/or a software client on a network device. For example, the web-based tool may be accessible via a website offering the network performance test. A user of the user device 102 may access the web-based tool through the network 105 to request the network performance test. As another example, the network device 116 can include the functionality to perform the network performance test. The user of the user device 102 may request the network performance test form the network device 116. The network device 116 may communicate with the computing device 104 to complete the network performance test.

The network performance test may determine whether the user device 102, the network device 116, and/or the network 105 are preventing the user device 102 from maximizing the network speed (e.g., the speed of the user's Internet connection). For example, the user device 102 may transmit and/or receive data to/from the computing device 104. The computing device 104 transmits a packet via the network 105 and the network device 116 to the user device 102. In an example, the computing device 104 determines a latency between the computing device 104 and the user device 102 by sending a packet comprising time data to the user device 102 to determine a length of time for the packet to be received by the user device 102. In another example, the result of the network performance test is the speed (e.g., megabytes per second (MB/s)) of the transfer between the computing device 104 and the user device 102. For example, the computing device 104 may transmit a predetermined size of data to the user device 102, and then based on a length of time for the transmission to complete, determine results of the network performance test in terms of upload speed, download speed, and/or latency. For example, the result of the network performance test may be that the user device 102 may achieve a download speed of 45 MB/s, an upload speed of 7 MB/s, and a 10 ms latency. While the example is explained as the computing device 104 transmitting a packet to the user device 102 for ease of explanation, a person skilled in the art would appreciate the user device 102 may also transmit the packet in order to perform the network performance test. Further, both the computing device 104 and the user device 102 may transmit and/or receive a request to perform the network performance test.

The computing device 104 communicates results of the network test to the user device 102. The computing device 104 communicates ways to improve the results of the network test to the user device 102. The computing device 104 communicates updated communications software 120 to the network device 116 to improve the results of the network test.

The computing device 104 can store network performance data 122 within the database 114. The network performance data 122 can comprise performance data of the user device 102, the network 105, the network device 116, and/or the computing device 104. The network performance data 122 can also comprise characteristics of the user device 102, the network 105, and the network device 116. For example, the network performance data 122 may include the hardware (e.g., processor, memory, battery, network interface, manufacturer, model number, etc.) and/or software (e.g., operating system, firmware, etc.) characteristics of the plurality of devices. A search of the database may be performed to identify data related to the user device 102 requesting the performance test.

The network performance data 122 can be crowd sourced data that is determined from the plurality of devices requesting a network performance test. For example, the computing device 104 (or other computing device) may execute (or cause execution of) a plurality of network performance tests for a plurality of different network devices 116 and a plurality of different user devices 102. The computing device 140 can receive and/or store the results of the plurality of network performance tests in the network performance data 122. The results of the plurality of network performance tests may be stored based on the identifier of the devices (e.g., the device identifier 108, the identifier 118). As an example, the computing device 104 may execute a network performance test for a plurality of users of an Internet Service Provider. The users can be located at different respective locations (e.g., each user's house, place of business, an associates house, etc.). Each of the users may have a respective user device 102 and a respective network device 116 associated with the user. Accordingly, the results of the network performance test will contain information related to the respective user device 102 and the respective network device 116. Thus, the network performance data 122 contains information related to a plurality of user devices 102 and a plurality of network devices 116 from a plurality of different locations.

The computing device 104 (or other computing device) can use network performance data 122 stored in the database related to the comparable devices to determine a network performance parameter of a comparable device to a user device 102 requesting the network performance test. The network performance parameter may be any parameter that impacts the network connection of the comparable device. The network performance parameter may be the maximum download speed and/or maximum upload speed that the comparable devices are capable of. For example, the network performance parameter of a comparable user device can be a maximum download and upload speed of 200 MB/s. As another example, the network performance parameter of a comparable network device can be a maximum download and upload speed of 600 MB/s. The computing device 104 (or other computing device) can use the network performance parameter of the comparable network device to determine an expected result for the network performance test requested by the user device 102. Thus, the computing device 104 can use the network performance data 122 while performing the network performance test.

FIG. 2 shows an example system 200. The example system 200 includes a premises 202 having a network device 116, a wireless access point 204, and user devices 102a, 102b, and 102c. In an example, the network device 116 may be configured to communicate with the network 105. The network device 116 may comprise a modem (e.g., cable modem), a router, a gateway, a switch, a network terminal (e.g., optical network unit), and/or the like. The network device 116 may be configured for communication with the network 105 via a variety of protocols, such as internet protocol, transmission control protocol, file transfer protocol, session initiation protocol, voice over internet protocol, and/or the like. For example, for a cable network, the network device 116 may be configured to provide network access via a variety of communication protocols and standards, such as Data Over Cable Service Interface Specification (DOCSIS).

The wireless access point 204 may be configured to provide one or more wireless networks in at least a portion of the premises 202. The wireless access point 204 may be configured to provide access to the network 105 via the network device 116 to devices configured with a compatible wireless radio, such as a user devices 102a, 102b, and 102c. For example, the wireless access point 204 may provide a user managed network (e.g., local area network), a service provider managed network (e.g., public network for users of the service provider), and/or the like. While the wireless access point 204 is shown as a separate device for ease of explanation, a person skilled in the art would appreciate that the network device 116 may include the functionality of the wireless access point 204.

The user devices 102a, 102b, and 102c may request a network performance test. The user device 102a can transmit and receive data to/from the network 105 via the wireless access point 204 and the network device 116. As an example, the user device 102a receives and/or transmits a packet via the network 105, the network device 116, and the wireless access point 204 to the user device 102. A latency between the user device 102a and the network 105 may be determined by sending a packet comprising time data to the user device 102a to determine the length of time for the packet to be received by the user device 102a. The result of the network performance test may be the speed (e.g., megabytes per second (MB/s)) of the transfer between the network 105 and the user device 102a. For example, the user device 102a may transmit and/or receive a predetermined size of data to/from the network 105 via the via the wireless access point 204 and the network device 116, and then based on a length of time for the transmission to complete, results of the network performance test in terms of upload speed, download speed, and/or latency may be determined. For example, the result of the network performance test may be that the user device 102a may achieve a download speed 45 MB/s, an upload speed of 7 MB/s, and a 10 ms latency via the wireless access point 204 and the network device 116.

However, a wireless network provides additional challenges for the network performance test. For example, the channel (e.g., 2.4 GHz, 5 GHz) used by the device requesting the network performance test may impact the results. As another example, the user device 102a may be located at the maximum range that the wireless access point 204 can reliably provide service. Thus, the location of the user device 102a may impact the network performance test because the signal strength (e.g., Received Signal Strength Indication (RSSI)) may be below an optimal threshold. Accordingly, the network performance test may take into account the signal strength of the device requesting the network performance test. For example, if the RSSI of the user device 102a is low, that will directly impact the throughput (e.g., connection speed, network performance) the user device 102a is capable of achieving. Thus, the network performance test can use the RSSI of the user device 102a in determining whether the RSSI is impacting the network performance test. In the event the RSSI of the user device 102a is low enough to impact the network performance test, the network performance test may recommend moving the user device 102a closer to the wireless access point 204 in order to improve the RSSI, which will improve the network performance seen by the user device 102a.

The other devices (e.g., user devices 102b, and 102c) using the wireless access point 204 can have an impact on the network performance test. For example, the user devices 102b and 102c may be streaming content from a content provider which requires significant bandwidth, which in turn impacts the bandwidth of the wireless network provided by the wireless access point 204. Accordingly, the network performance test may be negatively impacted. Thus, the network performance test can take into account Wi-Fi environment data. Wi-Fi environment data can include, for example, how many other Access Points (e.g., neighbors' access points) the wireless access point 204 can detect, how many devices are connected to the wireless access point 204, the wireless protocol of the wireless access point 204, the number of wireless antennas of the wireless access point 204, and interference detected by the wireless access point 204. The Wi-Fi environment data can be maintained and assessed to determine the load on the wireless network.

FIG. 3 is a flowchart of an example method 300. At step 310, network performance data (e.g., network performance data 122) may be received by a computing device (e.g., by the computing device 104). The computing device can receive the network performance data from a database (e.g., the database 114). For example, the database can be a central repository where a plurality of computing devices can store, or receive, the network performance data. The network performance data may include information related to a specific device's capability. The specific device can be one or more devices involved in the transfer of data between a user device and the computing device, including the user device and the computing device. In an example, the specific device may be a laptop and the network performance data may include information of characteristics of the laptop that may impact network performance. The network performance data may include the hardware characteristics of the device, such as processor, memory (e.g., volatile and nonvolatile memory), network interface, network capability (e.g., download speed, upload speed, latency), and so forth. Further, the network performance data may include the software characteristics of the device, such as operating system, firmware, applications running on the laptop, and so forth. The software characteristics and hardware characteristics of the device may be referred to as a specification of the device.

As an example, the specific device may be a laptop that has a processor operating at 2.2 GHz, 4 GB of Random Access Memory (RAM), a network card capable of download and upload speeds of 200 MB/s, a network connection of the laptop (e.g., wireless or wired), the version of the operating system executing on the laptop, any applications running on the laptop, and information related to the firmware executing on the laptop. The network performance data may also include general information of the laptop that may not directly impact network performance. For example, the general information may include an identifier associated with the laptop (e.g., device identifier 108), the age of the laptop, the manufacturer of the laptop, the display size of the laptop, information related to a user of the laptop, and any peripheral devices in communication with the laptop.

The network performance data can include data related to a plurality of user devices (e.g., a plurality of the user device 102) and a plurality of network devices (e.g., the network device 116). The network performance data can include data related to one or more of the user devices that have requested a network performance test, as well as the network devices associated with the user devices. As an example, if five different user devices request a network performance test, the network performance data of the five different user devices can be stored. The network performance data can be crowd sourced data that is captured over time as devices request network performance tests.

At step 320, a network performance request may be received (e.g., by the computing device 104) from a user device (e.g., the user device 102). The network performance request may include an identifier of the user device (e.g., device identifier 108) and/or an identifier of a network device (e.g., identifier 118 of the network device 116). The request can include parameters for operating the network performance test. The parameters can indicate one or more preferences of a user of the user device for performing the network performance test. Parameters can include, for example, a location of the computing device performing the network performance test, an expected speed of the network performance test, a size of data to test, and a length of time to conduct the network performance test. For example, the user device may indicate a location of the computing device that the user device would like to perform the network performance test.

At step 330, a network performance test can be performed by the computing device. The user device may transmit and receive data to/from the computing device. The computing device can determine a latency between the computing device and the user device by sending a packet comprising time data to the user device to determine the length of time for the packet to be received by the user device. For example, the time data may include a universal time stamp that indicates the time the packet was sent from the computing device. The user device and/or the computing device can compare the universal time stamp in the packet to the universal time stamp at the time the packet was received to determine the length of time the packet traveled from the computing device to the user device in order to determine the latency. As another example, the time data may include a local time stamp of the computing device. Upon receiving the packet, the user device can transmit the packet back (e.g., reply, respond) to the computing device. After receiving the packet from the user device, the computing device can then compare the current local time with the local time stamp within the packet to determine the length of time the packet traveled from the computing device to the user device in order to determine the latency.

The result of the network performance test can be the speed (e.g., megabytes per second (MB/s)) of the transfer between the computing device and the user device. For example, the computing device may transmit a predetermined size of data to the user device, and then based on a length of time for the transmission to complete, determine results of the network performance test in terms of upload speed, download speed, and/or latency. As an example, the result of the network performance test may be that the user device may achieve a download speed 50 MB/s, an upload speed of 5 MB/s, and a 5 ms latency.

At step 340, one or more comparable user devices can be determined by the computing device. The computing device can search stored network performance data (e.g., the network performance data 122) to determine comparable devices that are similar to the user device that requested the network performance test. As an example, the stored network performance data may be searched for comparable devices that have the same or similar device identifier (e.g., the device identifier 108) as the user device. A device may be considered comparable to the user device based on a plurality of characteristics (e.g., a specification of the device) that the comparable device and the user device have in common. The similarities may be drawn between hardware (e.g., processor, memory, battery, network interface, manufacturer, model number, etc.) and/or software (e.g., operating system, firmware, etc.). Further, a person skilled in the art would appreciate the comparable device may have characteristics that are identical to the user device. While comparable has been used for ease of explanation, a person skilled in the art will appreciate that comparable is interchangeable with other terms such as similar, related, like, relative, analogous, approximate, close, and so forth.

As an example of a comparable device, the user device may be a laptop that has a processor operating at 2.2 GHz, 4 GB of Random Access Memory (RAM), a network card capable of download and upload speeds of 200 MB/s, and a wireless network connection. A comparable device to the laptop may be a different laptop having a processor operating at 2.0 GHz, 6 GB of RAM, a network card capable of download and upload speeds of 200 MB/s, and a wireless network connection. While the characteristics between the two laptops are slightly different, the computing device may recognize that the differences are minor and will likely not impact the network performance test because the two laptops have the same download and upload capability. Stated differently, even though the two laptops are different, the computing device determines that the two laptops may have the same network performance test results with all else being equal during the network performance test. Accordingly, even though the two laptops are not identical, the two laptops are comparable to one another.

At step 350, one or more comparable network devices can be determined by the computing device (e.g., by the computing device 104). The computing device can search stored network performance data (e.g., the network performance data 122) to determine comparable network devices that are similar to the network device identified in the request for the network performance test. As an example, the stored network performance data may be searched for comparable network devices that have the same or similar device identifier (e.g., the identifier 118) as the identified network device. A network device may be considered comparable to the identified network device based on a plurality of characteristics that the comparable network device and the identified network device have in common. For example, the similarities may be drawn between hardware (e.g., processor, memory, number of antennas, number of communications channels, network interface, Data Over Cable Service Interface Specification (DOCSIS) Version, manufacturer, model number, etc.) and/or software (e.g., operating system, firmware, etc.). Further, a person skilled in the art would appreciate the comparable network device may have characteristics that are identical to the identified network device.

As an example of a comparable network device, the identified network device may be a gateway that has a processor operating at 1.3 GHz, 2 GB of RAM, 16 download channels, 4 upload channels, and provides a wireless network operating at 2.4 GHz. A comparable device to the identified network device may be a different network device having a processor operating at 1.0 GHz, 2 GB of RAM, 16 download channels, 4 upload channels, and provides a wireless network at 5.0 GHz. While the characteristics between the two network devices are slightly different, the computing device may recognize that the differences are minor and will likely not impact the network performance test because the two network devices have the same number of download and upload channels. Stated differently, even though the two network devices are different, the computing device determines that the two network devices may have the same network performance test results with all else being equal during the network performance test. Accordingly, even though the two network devices are not identical, the two network devices are comparable to one another.

At step 360, a network performance parameter of the one or more comparable user devices and network devices can be determined by the computing device (e.g., by the computing device 104). The computing device can use the network performance data stored in the database related to the comparable devices to determine a network performance parameter for the comparable devices. The network performance parameter may be any parameter that impacts the network connection of the device. The network performance parameter may be the maximum download speed and/or maximum upload speed that the comparable devices are capable of. For example, the network performance parameter of a comparable user device can be a maximum download and upload speed of 200 MB/s. As another example, the network performance parameter of a comparable network device can be a maximum download and upload speed of 600 MB/s. While a maximum download and upload speed are used for ease of explanation, a person skilled in the art would appreciate that any network performance parameter may be determined.

At step 370, the computing device (e.g., the computing device 104) may determine whether the user device, the network device, or neither is negatively impacting the network performance test. The computing device may apply the maximum download speeds of the comparable devices to the user device and the network device to determine a bottleneck in the system. For example, the result of the network performance test may be compared to the network performance parameters of the comparable user device and the comparable network device to determine if one of the devices is acting as a bottleneck.

As an example, the comparable user device may have a maximum download speed of 200 MB/s, the comparable network device may have a maximum download speed of 50 MB/s, and the network device may be connected to a communications network that has a download speed of 100 MB/s. The network performance test may have a result of a download speed of 50 MB/s. Since the communications network has a maximum download speed of 100 MB/s, and the result of 50 MB/s is less than the maximum, and the computing device may determine that the network device or the user device is the bottleneck preventing the maximum download speed. The computing device may evaluate the maximum download speeds of the comparable user device and the comparable network device to determine if the user device or the network device is the bottleneck of the system. As stated above, the comparable network device has a maximum download speed of 50 MB/s, and the comparable user device has a maximum download speed of 200 MB/s. Thus, the computing device may infer that the network device is the bottleneck and is impacting the network performance test because the maximum download speed of 50 MB/s of the comparable network device directly correlates to the result of the network performance test. Therefore, the computing device may determine the network device is negatively impacting the results of the network performance test based on the comparable network device's network performance parameter.

As another example, the computing device may not have information of the capabilities of the communications network in communication with the network device. The comparable user device may have a maximum download speed of 200 MB/s and the comparable network device may have a maximum download speed of 250 MB/s. The network performance test may have a result of a download speed of 150 MB/s. Since the comparable devices each have a maximum download speed over 150 MB/s, the computing device may determine that the communications network is the bottleneck preventing the maximum download speed.

The computing device can provide a recommendation on how to improve the network performance test. For example, if the network device is the bottleneck, the recommendation may include information of how to update the software and/or firmware of the network device. The computing device may automatically update the software and/or firmware of the network device and/or the user device to improve the network performance (e.g., via an Application Programming Interface (API)). As another example, if the network device's physical capabilities are maximized, the computing device may recommend replacing the network device with a newer device with better capabilities. As a further example, if the communications network is the bottleneck, the computing device may recommend upgrading the internet service of the user device to improve the network performance test.

The recommendation from the computing device may include adjusting one or more settings of the user device and/or the network device. The settings may include power settings, settings related to a number of devices permitted to access a network device, changing a channel of operation (e.g., 2.4 GHz, 5 GHz, etc.), modifying the channel of operation (e.g., if 2.4 GHz, modifying to 2.412 GHz, 2.417 GHz, 2.422 GHz, etc.), activating and/or deactivating a wireless extender, activating and/or deactivating traffic shaping (e.g., beamforming), controlling bandwidth allocations for one or more devices, controlling download and/or upload speeds for one or more devices, security settings (e.g., firewall, anti-virus), or any setting related to the operation of the user device, the network device, and/or the network. The computing device can automatically adjust one or more of the settings on the network device and/or the user device in order to improve the network performance.

FIG. 4 is a flowchart of an example method 400. At step 410, network performance data (e.g., network performance data 122) is received by a computing device (e.g., by the computing device 104). The computing device may receive the network performance data from a database (e.g., the database 114). For example, the database can be a central repository where a plurality of computing devices can store, or receive, the network performance data. The network performance data can include information related to a specific device's capability. The device may be a laptop and the network performance data may include information of characteristics of the laptop that may impact network performance. For example, the network performance data may include the hardware characteristics of the device, such as processor, memory (e.g., volatile and non-volatile memory), network interface, network capability (e.g., download speed, upload speed, latency), and so forth. Further, the network performance data may include the software characteristics of the device, such as operating system, firmware, applications running on the laptop, and so forth.

As an example, the device may be a laptop that has a processor operating at 2.2 GHz, 4 GB of Random Access Memory (RAM), a network card capable of download and upload speeds of 200 MB/s, a network connection of the laptop (e.g., wireless or wired), the version of the operating system executing on the laptop, any applications running on the laptop, and information of the firmware executing on the laptop. The network performance data may also include general information of the laptop that may not directly impact network performance. The general information may include an identifier associated with the laptop (e.g., device identifier 108), the age of the laptop, the manufacturer of the laptop, the display size of the laptop, information related to a user of the laptop, and any peripheral devices in communication with the laptop.

The network performance data may include data related a plurality of user devices (e.g., a plurality of the user device 102) and a plurality of network devices (e.g., the network device 116). The network performance data may include data related to one or more of the user devices that have requested a network performance test, as well as the network devices associated with the user devices. As an example, if five different user devices request a network performance test, the network performance data of the five different user devices is stored. The network performance data can be crowd sourced data that is captured over time as devices request network performance tests.

At step 420, a network performance request is received (e.g., by the computing device 104) from a user device (e.g., the user device 102). The network performance request includes an identifier of the user device (e.g., device identifier 108) and an identifier of a network device (e.g., identifier 118 of the network device 116). The request can include parameters for running the network performance test. The parameters can indicate one or more preferences of a user of the user device for performing the network performance test. Parameters can include, for example, a location of the computing device performing the network performance test, an expected speed of the network 26141.029902 performance test, a size of data to test, and a length of time to conduct the network performance test. For example, the user device may indicate a location of the computing device that the user device would like to perform the network performance test.

At step 430, a network performance test is performed by the computing device. The user device may receive and transmit data between the computing device. The computing device can determine a latency between the computing device and the user device by sending a packet comprising time data to the user device to determine the length of time for the packet to be received by the user device. For example, the time data may include a universal time stamp that indicates the time the packet was sent from the computing device. The user device and/or the computing device can compare the universal time stamp in the packet to the universal time stamp at the time the packet was received to determine the length of time the packet traveled from the computing device to the user device in order to determine the latency. As another example, the time data may include a local time stamp of the computing device. Upon receiving the packet, the user device can transmit the packet back (e.g., reply, respond) to the computing device. After receiving the packet from the user device, the computing device can then compare the current local time with the local time stamp within the packet to determine the length of time the packet traveled from the computing device to the user device in order to determine the latency.

The result of the network performance test may be the speed (e.g., megabytes per second (MB/s)) of the transfer between the computing device and the user device. For example, the computing device may transmit a predetermined size of data to the user device, and then based on a length of time for the transmission to complete, determine results of the network performance test in terms of upload speed, download speed, and/or latency. The result of the network performance test may be that the user device may achieve a download speed 50 MB/s, an upload speed of 5 MB/s, and a 5 ms latency.

At step 440, one or more comparable user devices are determined by the computing device. The computing device may search stored network performance data (e.g., the network performance data 122) to determine comparable devices that are similar to the user device that requested the network performance test. The stored network performance data can be searched for comparable devices that have the same or similar device identifier (e.g., the device identifier 108) as the user device. A device may be considered comparable to the user device based on a plurality of characteristics that the comparable device and the user device have in common. For example, the similarities may be drawn between hardware (e.g., processor, memory, battery, network interface, manufacturer, model number, etc.) and/or software (e.g., operating system, firmware, etc.). Further, a person skilled in the art would appreciate the comparable device may have characteristics that are identical to the user device. While comparable has been used for ease of explanation, a person skilled in the art will appreciate that comparable is interchangeable with other terms such as similar, related, like, relative, analogous, approximate, close, and so forth.

As an example of a comparable device, the user device may be a laptop that has a processor operating at 2.2 GHz, 4 GB of Random Access Memory (RAM), a network card capable of download and upload speeds of 200 MB/s, and a wireless network connection. A comparable device to the laptop may be a different laptop having a processor operating at 2.0 GHz, 6 GB of RAM, a network card capable of download and upload speeds of 200 MB/s, and a wireless network connection. While the characteristics between the two laptops are slightly different, the computing device may recognize that the differences are minor and will likely not impact the network performance test because the two laptops have the same download and upload capability. Stated differently, even though the two laptops are different, the computing device determines that the two laptops may have the same network performance test results with all else being equal during the network performance test. Accordingly, even though the two laptops are not identical, the two laptops are comparable to one another.

At step 450, one or more comparable network devices are determined by the computing device (e.g., by the computing device 104). The computing device can search stored network performance data (e.g., the network performance data 122) to determine comparable network devices that are similar to the network device identified in the request for the network performance test. The stored network performance data may be searched for comparable network devices that have the same or similar device identifier (e.g., the identifier 118) as the identified network device. A network device may be considered comparable to the identified network device based on a plurality of characteristics that the comparable network device and the identified network device have in common. For example, the similarities may be drawn between hardware (e.g., processor, memory, number of antennas, number of communications channels, network interface, Data Over Cable Service Interface Specification (DOCSIS) Version, manufacturer, model number, etc.) and/or software (e.g., operating system, firmware, etc.). Further, a person skilled in the art would appreciate the comparable network device may have characteristics that are identical to the identified network device.

As an example of a comparable network device, the identified network device may be a gateway that has a processor operating at 1.3 GHz, 2 GB of RAM, 16 download channels, 4 upload channels, and provides a wireless network operating at 2.4 GHz. A comparable device to the identified network device may be a different network device having a processor operating at 1.0 GHz, 2 GB of RAM, 16 download channels, 4 upload channels, and provides a wireless network at 5.0 GHz. While the characteristics between the two network devices are slightly different, the computing device may recognize that the differences are minor and will likely not impact the network performance test because the two network devices have the same number of download and upload channels. Stated differently, even though the two network devices are different, the computing device determines that the two network devices may have the same network performance test results with all else being equal during the network performance test. Accordingly, even though the two network devices are not identical, the two network devices are comparable to one another.

At step 460, an expected performance parameter of the user device is determined by the computing device. The computing device can use the network performance data stored in the database to determine an expected performance parameter for the user device. The expected performance parameter may be the maximum download speed and/or maximum upload speed that the user device is capable of. For example, the computing device may determine that devices comparable to the user device have a maximum download and upload speed of 200 MB/s. Thus, the computing device may infer that the user device has a similar maximum download and upload speed as the comparable devices, and expect that the user device would achieve 200 MB/s downloading, as well as uploading, if there are no other bottlenecks. Accordingly, the computing device may determine the user device has an expected maximum download and upload speed of 200 MB/s. While a maximum download and upload speed are used for ease of explanation, a person skilled in the art would appreciate that any network performance parameter may be determined.

At step 470, the computing device (e.g., the computing device 104) can determine whether the user device and/or the network device is negatively impacting the network performance test. The result of the network performance test may be compared to the expected performance parameter of the user device and the performance parameter of the comparable network device to determine if one of the devices is acting as a bottleneck. The computing device may determine that the user device, the network device, or neither device is negatively impacting the network performance test.

As an example, the user device may have an expected maximum download speed of 200 MB/s, the comparable network device may have a maximum download speed of 50 MB/s, and the network device may be connected to a communications network that has a download speed of 100 MB/s. The network performance test may have a result of a download speed of 50 MB/s. Since the communications network has a maximum download speed of 100 MB/s, and the result of 50 MB/s is less than the maximum, and the computing device may determine that the network device or the user device is the bottleneck preventing the maximum download speed. The computing device may evaluate the expected download speed of the user device and the maximum download speed of the comparable network device to determine if the user device or the network device is the bottleneck of the system. As stated above, the comparable network device has a maximum download speed of 50 MB/s, and the user device has an expected maximum download speed of 200 MB/s. Thus, the computing device may infer that the network device is the bottleneck and is impacting the network performance test because the maximum download speed of 50 MB/s of the network device directly correlates to the result of the network performance test. Therefore, the computing device may determine the network device is negatively impacting the results of the network performance test.

The computing device can provide a recommendation on how to improve the network performance test. For example, if the network device is the bottleneck, the recommendation may include information of how to update the software and/or firmware of the network device. The computing device may automatically update the software and/or firmware of the network device and/or the user device to improve the network performance. As another example, if the network device's physical capabilities are maximized, the computing device may recommend replacing the network device with a newer device with better capabilities. As a further example, if the communications network is the bottleneck, the computing device may recommend upgrading the internet service of the user device to improve the network performance test.

The recommendation from the computing device may include adjusting one or more settings of the user device and/or the network device. The settings may include power settings, settings related to a number of devices permitted to access a network device, changing a channel of operation (e.g., 2.4 GHz, 5 GHz, etc.), modifying the channel of operation (e.g., if 2.4 GHz, modifying to 2.412 GHz, 2.417 GHz, 2.422 GHz, etc.), activating and/or deactivating a wireless extender, activating and/or deactivating traffic shaping (e.g., beamforming), controlling bandwidth allocations for one or more devices, controlling download and/or upload speeds for one or more devices, security settings (e.g., firewall, anti-virus), or any setting related to the operation of the user device, the network device, and/or the network. The computing device can automatically adjust one or more of the settings on the network device and/or the user device in order to improve the network performance.

FIG. 5 is a flowchart of an example method 500. At step 510, a network performance request is received by a computing device (e.g., by the computing device 104) from a user device (e.g., the user device 102). The network performance request includes an identifier of the user device (e.g., device identifier 108) and an identifier of a network device (e.g., identifier 118 of the network device 116). The request can include parameters for running the network performance test. The parameters can indicate one or more preferences of a user of the user device for performing the network performance test. Parameters can include, for example, a location of the computing device performing the network performance test, an expected speed of the network performance test, a size of data to test, and a length of time to conduct the network performance test. For example, the user device may indicate a location of the computing device that the user device would like to perform the network performance test.

At step 520, a network performance test is performed by the computing device. The user device may receive and transmit data between the computing device. The computing device can determine a latency between the computing device and the user device by sending a packet comprising time data to the user device to determine the length of time for the packet to be received by the user device. For example, the time data may include a universal time stamp that indicates the time the packet was sent from the computing device. The user device and/or the computing device can compare the universal time stamp in the packet to the universal time stamp at the time the packet was received to determine the length of time the packet traveled from the computing device to the user device in order to determine the latency. As another example, the time data may include a local time stamp of the computing device. Upon receiving the packet, the user device can transmit the packet back (e.g., reply, respond) to the computing device. After receiving the packet from the user device, the computing device can then compare the current local time with the local time stamp within the packet to determine the length of time the packet traveled from the computing device to the user device in order to determine the latency.

The result of the network performance test may be the speed (e.g., megabytes per second (MB/s)) of the transfer between the computing device and the user device. For example, the computing device may transmit a predetermined size of data to the user device, and then based on a length of time for the transmission to complete, determine results of the network performance test in terms of upload speed, download speed, and/or latency. As an example, the result of the network performance test may be that the user device may achieve a download speed 50 MB/s, an upload speed of 5 MB/s, and a 5 ms latency.

At step 530, a performance parameter of the user device and a performance parameter of the network device are determined by the computing device. The performance parameter of the user device and the performance parameter of the network device can be determined from the results of the network performance test. For example, the computing device may search the database using the identifier of the network device to determine a performance parameter for the network device. The performance parameter may be any parameter that impacts the network connection of the device. The performance parameter may be the maximum download speed and/or maximum upload speed of the network device. The network device can provide the performance parameter to the computing device. The computing device may use the performance parameter of the network device, along with information about the communications connection, to determine the performance parameter for the user device.

As an example, the performance parameter of the network device may be a maximum download and upload speed of 600 MB/s and the network device may be connected to a communications network that has a download speed of 200 MB/s. The network performance test may have a result of a download speed of 150 MB/s. Since the communications network has a maximum download speed of 200 MB/s and the network device has a maximum download speed of 600 MB/s, and the result of 150 MB/s indicates that the user device is the bottleneck preventing the maximum download speed. Accordingly, the computing device may determine that the performance parameter for the user device is 150 MB/s. While a maximum download speed is used for ease of explanation, a person skilled in the art would appreciate that any network performance parameter may be determined.

At step 540, the performance parameter of the user device is stored (e.g., in the database 114) by the computing device. The performance parameter of the user device can be stored based on the identifier of the user device. The database may comprise crowd sourced data related to one or more of the user devices that have requested a network performance test.

At step 550, the performance parameter of the network device is stored (e.g., in the database 114) by the computing device. The performance parameter of the network device can be stored based on the identifier of the network device. The database may comprise crowd sourced data related to one or more of the user devices that have requested a network performance test.

The stored data can be used to determine characteristics of the plurality of user devices and the plurality of network devices. For example, machine learning or statistical analysis may be applied to the stored data to determine operating characteristics of the plurality of user devices and the plurality of network devices. The stored data may be processed to determine additional information related to the plurality of network devices and the plurality of user devices such as information related to how to improve a user's network connection, information related to users of the devices, the impact the devices have on the network, and so forth.

Figure 6:
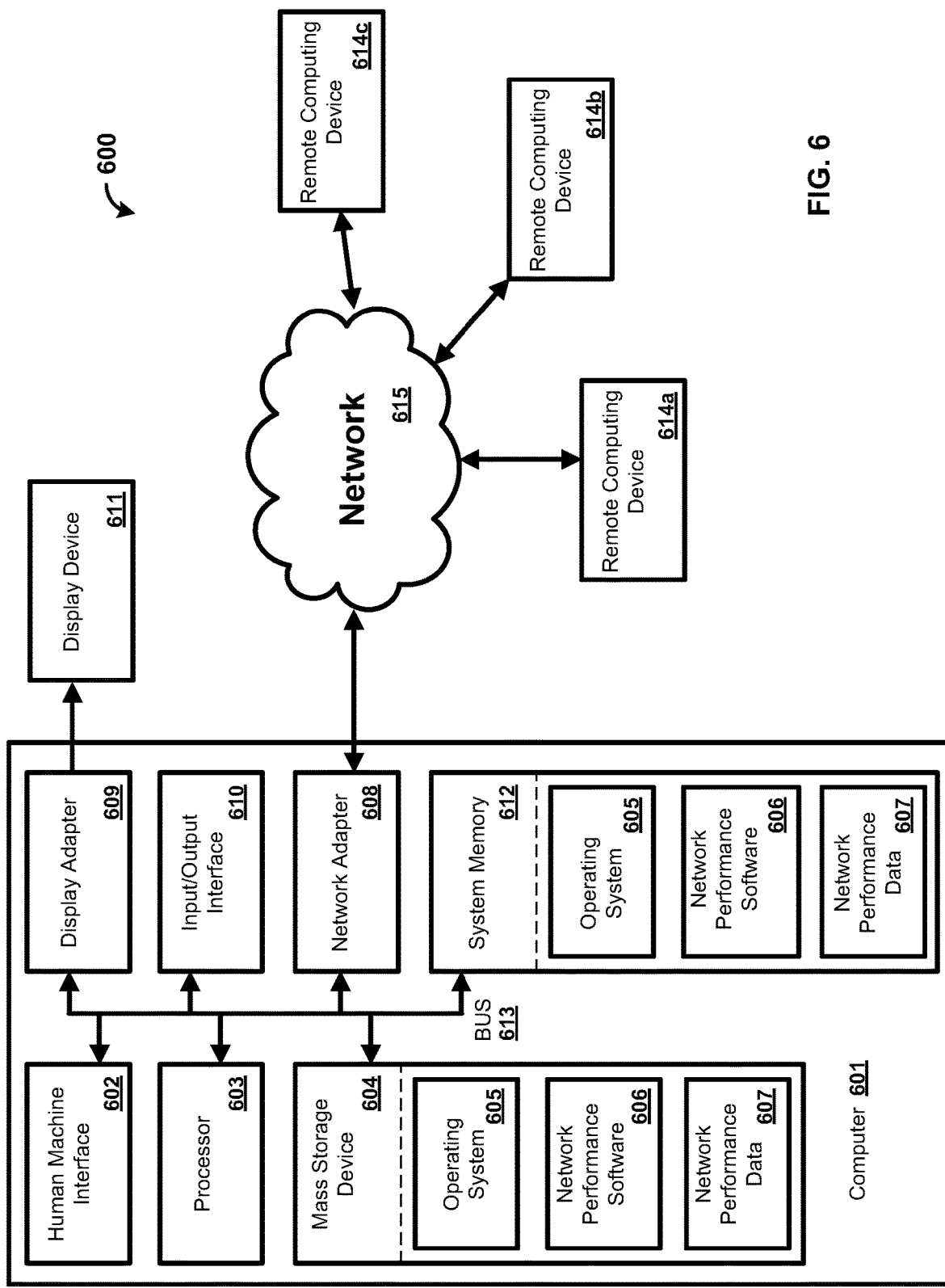
FIG. 6 is a block diagram of an example computing device.

FIG. 6 is a block diagram showing an example of an operating environment 600 for performing the described methods. An example computer 601 may be configured to perform any of the methods and/or systems described herein. By way of example, user device 102, the computing device 104, or the network device 116 of FIG. 1 may be a computer as shown in FIG. 6. Similarly, the methods and systems described may utilize one or more computers to perform one or more functions in one or more locations. The example of the operating environment provided is only an example of an operating environment and is not intended to suggest any limitation as to the scope of use or functionality of operating environment architecture. Neither should the operating environment be interpreted as having any dependency or requirement relating to any one or combination of components shown in the example of the operating environment.

The present methods and systems may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the described methods and systems may be performed by software components. The described systems and methods may be described in the general context of computer-executable instructions, such as program modules, being executed by one or more computers or other devices. Generally, program modules comprise computer code, routines, programs, objects, components, data structures, etc., that perform particular tasks or implement particular abstract data types. The described methods may also be practiced in grid-based and distributed computing environments where tasks are performed by remote processing devices that are linked through a communications network. In a distributed computing environment, program modules may be located in both local and remote computer storage media including memory storage devices.

Further, one skilled in the art will appreciate that the systems and methods described herein may be implemented via a general-purpose computing device in the form of a computer 601. The components of the computer 601 may comprise, but are not limited to, one or more processors 603, a system memory 612, and a system bus 613 that couples various system components including the one or more processors 603 to the system memory 612. The system 600 may utilize parallel computing.

The system bus 613 represents one or more of several possible types of bus structures, including a memory bus or memory controller, a peripheral bus, an accelerated graphics port, or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The system bus 613, and all buses specified in this description, may also be implemented over a wired or wireless network connection and each of the subsystems, including the one or more processors 603, a mass storage device 604, an operating system 605, network performance software 606, network performance data 607, a network adapter 608, the system memory 612, an Input/Output Interface 610, a display adapter 609, a display device 611, and a human machine interface 602, may be contained within one or more remote computing devices 614a,b,c at physically separate locations, connected through buses of this form, in effect implementing a fully distributed system.

The computer 601 typically comprises a variety of computer readable media. Exemplary readable media may be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as the network performance data 607 and/or program modules such as the operating system 605 and the network performance software 606 that are immediately accessible to and/or are presently operated on by the one or more processors 603.

The computer 601 may also comprise other removable/non-removable, volatile/non-volatile computer storage media. By way of example, FIG. 6 shows the mass storage device 604 which may provide non-volatile storage of computer code, computer readable instructions, data structures, program modules, and other data for the computer 601. For example, and not meant to be limiting, the mass storage device 604 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 604, including by way of example, the operating system 605 and the network performance software 606. The network performance data 607 may also be stored on the mass storage device 604. The network performance data 607 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

The user may enter commands and information into the computer 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices may be connected to the one or more processors 603 via the human machine interface 602 that is coupled to the system bus 613, but may be connected by other interface and bus structures, such as a parallel port, game port, an IEEE 1394 Port (also known as a Firewire port), a serial port, or a universal serial bus (USB).

The display device 611 may also be connected to the system bus 613 via an interface, such as the display adapter 609. It is contemplated that the computer 601 may have more than one display adapter 609 and the computer 601 may have more than one display device 611. For example, the display device 611 may be a monitor, an LCD (Liquid Crystal Display), or a projector. In addition to the display device 611, other output peripheral devices may comprise components such as speakers (not shown) and a printer (not shown) which may be connected to the computer 601 via the Input/Output Interface 610. Any step and/or result of the methods may be output in any form to an output device. Such output may be any form of visual representation, including, but not limited to, textual, graphical, animation, audio, tactile, and the like. The display device 611 and computer 601 may be part of one device, or separate devices.

The computer 601 may operate in a networked environment using logical connections to one or more remote computing devices 614*a,b,c*. By way of example, a remote computing device may be a personal computer, portable computer, smartphone, a server, a router, a network computer, a peer device or other common network node, and so on. Logical connections between the computer 601 and a remote computing device 614*a,b,c* may be made via a network 615, such as a local area network (LAN) and/or a general wide area network (WAN). Such network connections may be through the network adapter 608. The network adapter 608 may be implemented in both wired and wireless environments. Such networking environments are conventional and commonplace in dwellings, offices, enterprise-wide computer networks, intranets, and the Internet.

For ease of explanation, application programs and other executable program components such as the operating system 605 are shown herein as discrete blocks, although it is recognized that such programs and components reside at various times in different storage components of the computing device 601, and are executed by the one or more processors 603 of the computer. An implementation of the network performance software 606 may be stored on or transmitted across some form of computer readable media. Any of the described methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The methods and systems may employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., Expert inference rules generated through a neural network or production rules from statistical learning).

While the methods and systems have been described in connection with specific examples, it is not intended that the scope be limited to the particular examples set forth, as the examples herein are intended in all respects to be possible examples rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of examples described in the specification.

It will be apparent to those skilled in the art that various modifications and variations may be made without departing from the scope or spirit. Other examples will be apparent to those skilled in the art from consideration of the specification and practice described herein. It is intended that the specification and examples be considered as exemplary only, with a true scope and spirit being indicated by the following claims.

The invention claimed is:

1. A method comprising:
   determining network performance data associated with a plurality of devices;
   receiving, from a user device, a network performance request associated with a network condition, wherein the network performance request identifies the user device and a network device;
   determining, based on the network performance data and the network performance request, a comparable user device of the plurality of devices and a comparable network device of the plurality of devices;
   determining a performance parameter of the comparable user device and a performance parameter of the comparable network device; and
   determining, based on the performance parameter of the comparable user device or the performance parameter of the comparable network device, that the user device or the network device is not negatively impacting the network condition.

2. The method of claim 1, wherein the network condition comprises at least one of: an indication of an upload speed, an indication of a download speed, or an indication of a latency.

3. The method of claim 1, wherein the plurality of devices comprises at least one of: a quantity of access points, a quantity of user devices, a quantity of routers, a quantity of gateways, a quantity of modems, or a quantity of other devices in range of the network device.

4. The method of claim 1, wherein receiving the network performance request comprises receiving, from the user device, a user device identifier associated with the user device and a network device identifier associated with the network device.

5. The method of claim 4, wherein determining the comparable user device of the plurality of devices is further based on the user device identifier.

6. The method of claim 1, further comprising an operation configured to improve the network condition.

7. The method of claim 1, further comprising sending, to the user device, a message indicating that the user device or the network device is not negatively impacting the network condition.

8. A system comprising:
a computing device configured to:
  determine network performance data associated with a plurality of devices;
  receive, from a user device, a network performance request associated with a network condition, wherein the network performance request identifies the user device and a network device;
  determine, based on the network performance data and the network performance request, a comparable user device of the plurality of devices and a comparable network device of the plurality of devices;
  determine a performance parameter of the comparable user device and a performance parameter of the comparable network device;
  determine, based on the performance parameter of the comparable user device or the performance parameter of the comparable network device, that the user device or the network device is not negatively impacting the network condition; and
the user device configured to:
  receive an indication that the user device or the network device is not negatively impacting the network condition.

9. The system of claim 8, wherein the network condition comprises at least one of: an indication of an upload speed, an indication of a download speed, or an indication of a latency.

10. The system of claim 8, wherein the plurality of devices comprises at least one of: a quantity of access points, a quantity of user devices, a quantity of routers, a quantity of gateways, a quantity of modems, or a quantity of other devices in range of the network device.

11. The system of claim 8, wherein the network performance request comprises a user device identifier associated with the user device and a network device identifier associated with the network device.

12. The system of claim 11, wherein the computing device is further configured to determine, based on the user device identifier, one or more comparable user devices and at least one user device performance metric associated with at least one comparable user device of the one or more comparable user devices.

13. The system of claim 8, wherein the computing device is further configured to determine an operation configured to improve the network condition.

14. The system of claim 8, wherein the computing device is further configured to send, to the user device, a message indicating that the user device or the network device is not negatively impacting the network condition.

15. One or more non-transitory computer-readable media storing processor-executable instructions thereon that, when executed by at least one processor, cause the at least one processor to:
  determine network performance data associated with a plurality of devices;
  receive, from a user device, a network performance request associated with a network condition, wherein the network performance request identifies the user device and a network device;
  determine, based on the network performance data and the network performance request, a comparable user device of the plurality of devices and a comparable network device of the plurality of devices;
  determine a performance parameter of the comparable user device and a performance parameter of the comparable network device; and
  determine, based on the performance parameter of the comparable user device or the performance parameter of the comparable network device, that the user device or the network device is not negatively impacting the network condition.

16. The computer-readable media of claim 15, wherein the network condition comprises at least one of: an indication of an upload speed, an indication of a download speed, or an indication of a latency.

17. The computer-readable media of claim 15, wherein the plurality of devices comprises at least one of: a quantity of access points, a quantity of user devices, a quantity of routers, a quantity of gateways, a quantity of modems, or a quantity of other devices in range of the network device.

18. The computer-readable media of claim 15, wherein the processor-executable instructions that, when executed by the at least one processor, cause the at least one processor to receive the network performance request further cause the at least one processor to receive, from the user device, a user device identifier associated with the user device and a network device identifier associated with the network device.

19. The computer-readable media of claim 18, wherein the processor-executable instructions, when executed by the at least one processor, further cause the at least one processor to determine, based on the user device identifier, one or more comparable user devices and at least one user device performance metric associated with at least one comparable user device of the one or more comparable user devices.

20. The computer-readable media of claim 15, wherein the processor-executable instructions, when executed by the at least one processor, further cause the at least one processor to send, to the user device, a message indicating that the user device or the network device is not negatively impacting the network condition.

* * * * *